United States Patent [19]
Mabuchi et al.

[11] Patent Number: 6,156,432
[45] Date of Patent: Dec. 5, 2000

[54] CARBON MATERIAL FOR NEGATIVE ELECTRODE OF SECONDARY LITHIUM BATTERY, PROCESS FOR PREPARING THE SAME, AND SECONDARY LITHIUM BATTERY PREPARED FROM SAID CARBON MATERIAL

[75] Inventors: Akihiro Mabuchi, Amagasaki; Hiroyuki Fujimoto, Sakurai; Takahiro Kasuh, Kobe; Katsuhisa Tokumitsu, Hirakata, all of Japan

[73] Assignee: Osaka Gas Company Limited, Japan

[21] Appl. No.: 09/230,345

[22] PCT Filed: Jul. 18, 1997

[86] PCT No.: PCT/JP97/02520

§ 371 Date: Jan. 25, 1999

§ 102(e) Date: Jan. 25, 1999

[87] PCT Pub. No.: WO98/04497

PCT Pub. Date: Feb. 5, 1998

[30] Foreign Application Priority Data

Jul. 25, 1996 [JP] Japan ..................................... 8-196208

[51] Int. Cl.[7] ............................. B32B 69/00; H01M 4/48

[52] U.S. Cl. ..................... 428/408; 423/448; 423/445 R; 429/231.4; 429/231.8

[58] Field of Search ............................. 428/408; 423/448, 423/445 R; 429/231.4, 231.8

[56] References Cited

U.S. PATENT DOCUMENTS

| | | | |
|---|---|---|---|
| 5,244,757 | 9/1993 | Takami et al. | 429/194 |
| 5,667,914 | 9/1997 | Nagamine et al. | 429/194 |
| 5,698,341 | 12/1997 | Tamaki et al. | 429/218 |
| 5,753,387 | 5/1998 | Takami et al. | 429/194 |
| 5,932,373 | 8/1999 | Nagamine et al. | 429/218.1 |

FOREIGN PATENT DOCUMENTS

| | | |
|---|---|---|
| 6-089721 | 3/1994 | Japan . |
| 8-104510 | 4/1996 | Japan . |
| 9-153359 | 6/1997 | Japan . |

*Primary Examiner*—Deborah Jones
*Assistant Examiner*—Jason D Resnick
*Attorney, Agent, or Firm*—Larson & Taylor, PLC

[57] ABSTRACT

In accordance with the present invention, lithium secondary batteries excellent in charge/discharge characteristics, in particular in charge/discharge capacity and initial efficiency, and high in safety can be provided.

15 Claims, No Drawings

CARBON MATERIAL FOR NEGATIVE ELECTRODE OF SECONDARY LITHIUM BATTERY, PROCESS FOR PREPARING THE SAME, AND SECONDARY LITHIUM BATTERY PREPARED FROM SAID CARBON MATERIAL

TECHNICAL FIELD

The present invention relates to a negative electrode for lithium secondary battery, a negative electrode material therefor (a graphite material and a carbon material coated with a low-crystalline carbon), and a process for preparing the same. More specifically, the invention relates to a negative electrode for a lithium secondary battery having a high discharge capacity as well as a high initial efficiency, a negative electrode material therefor, and a process for preparing the same. The present invention also relates to a nonaqueous lithium secondary battery and a solid-electrolyte lithium secondary battery.

BACKGROUND ART

With regard to lithium secondary batteries in which graphite is used, there are a number of patent applications, including Japanese Unexamined Patent Publication No.57-208079 (Japanese Examined Patent Publication No.62-23433). However, the theoretical capacity of graphite as calculated from the composition $LiC_6$ is considered 372 Ah/kg (carbon basis). The theoretical capacity of graphite as a host for lithium is also 372 Ah/kg (carbon basis). Thus, there has been a limit to discharge capacity.

However, the electronic device industry uninterruptedly demands conspicuous improvements in battery performance. To meet the requirements for high performance battery, significant improvements in the properties of the negative electrode to be used in the lithium secondary battery are essential. In view of the situation, the capacity of 372 Ah/kg cannot be considered sufficiently high in terms of negative electrode capacity.

Therefore, the modification of graphite-based intercalation compound heretofore-proposed is not enough to attain the needed lithium storage capacity.

The object of the present invention, in consideration of the above state of the art, is to provide a lithium secondary battery having a charge/discharge capacity exceeding the theoretical capacity of 372 Ah/kg and to provide negative electrode useful in the a lithium secondary battery, a negative electrode material, and a process for preparing a carbon material therefor.

DISCLOSURE OF INVENTION

Under the circumstances, the present inventors made intensive researches and found that when pores are intentionally formed in the crystal structure of graphite to be used as a negative electrode material for lithium secondary batteries, though the initial efficiency falls, unexpectedly, the charge/discharge capacity increases; that when said graphite is coated with a low-crystalline carbon, the fall in initial efficiency can be mitigated; and that a carbon material comprising carbon particles or aggregated carbon particles and having the surface coated with a low or moderately crystalline carbon can be produced by immersing a graphite material, which is to serve as the core material, in a carbonizable organic compound, such as tar or pitch, and then carbonizing the same.

The present invention provides a graphite material, a carbon material, a process for preparing said carbon material, a negative electrode material for lithium secondary battery, a negative electrode for lithium secondary battery, and a lithium secondary battery, as specified below.

1. A graphite material satisfying the following requirements:
   (A) The interlayer-spacing ($d_{002}$) determined by wide-angle X ray diffractometry for the plane (002) is not more than 0.336 nm;
   (B) The cavity index (CI) defined by the following expression is not less than 0.019:

$$CI = 1 - \frac{D}{D^i} \times \frac{C_0}{C_0^i} \times \left(\frac{a_0}{a_0^i}\right)^2 \times \frac{Lc}{Lc + C_0/2} \times \left(\frac{La}{La + a_0}\right)^2$$

where D represents the density, $c_0$ and Lc represent the lattice constant and crystallite size, respectively, in the direction of c axis, $a_0$ and La represent the lattice constant and crystallite size, respectively, in the direction of a axis, and the superscript "i" represents the value for an ideal graphite; the density value is the value obtained by the method according to JIS R 7212 and the crystallite size value is the value obtained by the method established by the Japan Society for the Promotion of Science;
   (C) The discharge capacity exceeds 372 Ah/kg.

2. A carbon material coated with a low-crystalline carbon which is characterized in that the surface of the graphite material defined in paragraph 1 above is coated with a coat-forming carbon material.

3. A carbon material coated with a low-crystalline carbon which is characterized in that the surface of the graphite material as defined in paragraph 1 above is coated with a double-layer structure formed from coat-forming carbon materials.

4. A process for preparing the low-crystallinity carbon-coated carbon material as defined in claim 2 above which comprises immersing the graphite material as defined in paragraph 1 above, which serves as the core material, in an organic compound at 10~300° C., separating the graphite material from the organic compound, adding an organic solvent to the separated graphite material and effecting washing treatment at 10~300° C., and then carbonizing the washed graphite material.

5. A process for preparing the low-crystallinity carbon-coated carbon material as defined in paragraph 3 above which comprises immersing once more the carbon material obtained by the method of paragraph 4 above in an organic compound at 10~300° C., separating the carbon material from the organic compound, adding an organic solvent to the separated carbon material and effecting washing treatment at 10~300° C., and then carbonizing the washed graphite material.

6. A process as defined in paragraph 4 above which is characterized in that the carbonization is carried out under vacuum.

7. A process as defined in paragraph 4 above which is characterized in that the organic compound is a carbonizable pitch or tar.

8. A material for negative electrode in a lithium secondary battery which comprises the graphite material as defined in paragraph 1 above or the carbon material as defined in paragraph 2 or 3 above.

9. A negative electrode for a lithium secondary battery in which the negative electrode material as defined in paragraph 8 above is used.

10. A nonaqueous lithium secondary battery in which the negative electrode as defined in paragraph 9 above is used as a constituent thereof.

11. A solid electrolyte lithium secondary battery in which the negative electrode as defined in paragraph 10 above is used as a constituent thereof.

BEST MODES FOR CARRYING OUT THE INVENTION (1) Graphite Material

Usable as the graphite material are natural graphite, artificial graphite, graphitized mesocarbon microbeads, graphitized pitch-based carbon fibers and the like. A graphite material having an average particle size (fiber length) of about 1 to 100 μm, preferably about 5 to 50 μm, is suitable as the negative electrode material for lithium secondary batteries.

The graphite material of the invention has a high cavity index. The cavities formed in the crystal structure of the graphite material can be evaluated in terms of cavity index (CI), which is a structure parameter defined by the formula shown below.

$$CI = 1 - \frac{D}{D^i} \times \frac{C_0}{C_0^i} \times \left(\frac{a_0}{a_0^i}\right)^2 \times \frac{Lc}{Lc + C_0/2} \times \left(\frac{La}{La + a_0}\right)^2$$

wherein D represents the density, $c_0$ and $Lc$ present the lattice constant and crystallite size, respectively, in the direction of c axis, $a_0$ and $La$ represent the lattice constant and crystallite size, respectively, in the direction of a axis, and the superscript "i" represents the value for an ideal graphite; $D^i$, $c_0^i$ and $a_0^i$ represent 2.27 g/cc, 0.6708 nm and 0.24612 nm, respectively.

As regards the density, the value found according to the method of JIS R 7212 is used. Thus, the density value is calculated from the weight of the sample and the volume thereof when it is immersed in n-butanol.

$c_0$ and $a_0$ can be calculated as follows:

$c_0 = 2d_{002}$ $a_0 = (2\sqrt{3}/3)d_{110} = 1.1547 \, d_{110}$ $d_{002}$ represents the interplaner spacing of the (002) plane, which is a parameter obtainable by wide-angle X ray diffractometry and $d_{110}$ represents the interplaner spacing of the (110) plane. The values to be used as the crystallite sizes such as Lc and La are the values found by the method established by the Japan Society for the Promotion of Science 117th committee (the Japan Society for the Promotion of Science method: Michio Inagaki, Tanso, 1963 [36], 25).

The graphite material of the present invention comprises a graphite with a $d_{002}$ value of not more than 0.336 nm (usually 0.3354 to 0.336 nm) and a CI value of not less than 0.019 (usually 0.019 to 0.025). Such graphite as it is shows a discharge capacity exceeding 372 Ah/kg (on the carbon basis) when used as the negative electrode material for a lithium secondary battery.

(2) Preparation Of The Graphite Material

Cavities can be produced in the crystal structure of carbon by, for example, applying an external physical force to graphite. The most convenient method for producing cavities in the crystal structure of carbon is a grinding method. The method of grinding is not limited to any particular technique but any of those techniques utilizing a means for mechanical attrition, such as a ball mill, hammer mill, CF mill or atomizer mill, and techniques using a jet mill or the like which utilizes the wind force can be employed. Those grinding techniques which utilize the wind force are preferred.

For the purpose of grinding, a refrigerated or freeze-grinder or the like may also be used to thereby control heat generation during grinding and improve the efficiency of grinding. As other means for processing than grinding, supersonic waves, microwaves or the like can be used for producing cavities in the crystal structure of carbon.

As for the method of forming cavities, any technique may be employed, as mentioned above. However, it is considered that there is a lowest limit to the effect of the external physical force. It is considered that the application of an external force below a certain level will not result in the formation of cavities that are effective for the charge/discharge reaction. As one measure for confirming the formation of cavities effective for the charge/discharge reaction, there may be mentioned a rapid decrease in crystallite size in the direction of c axis in the graphite material.

(3) Carbon Material Coated With A Low-Crystalline Carbon

The present invention provides, as a negative electrode material for lithium secondary batteries, a carbon material comprising those carbon particles or powders consisting of aggregates of carbon particles, as derived from a graphite material to serve as the core material (graphite with cavities formed in the crystal structure thereof), which are coated, on the surface thereof, with a low-crystalline carbon (i.e. a carbon material coated with a lowly crystalline carbon).

The low-crystallinity carbon-coated carbon material can be prepared by immersing a graphite material to serve as the core material in an organic compound at 10~300° C., preferably 100~200° C., separating the organic compound-coated graphite material from the organic compound, adding an organic solvent to the thus-obtained graphite material and washing the material at 10~300° C., preferably 10~100° C., and then carbonizing the washed material.

Usable as the organic compound are carbonizable materials such as pitch and tar. Usable as the organic solvent are toluene, methanol, acetone, hexane, benzene, xylene, methylnaphthalene, tar middle oil and the like. The carbonization of the carbonaceous material after washing treatment can be effected by treating the same at a temperature of about 600~1500° C., preferably about 800~1200° C., for about 1 to 20 hours, preferably about 3 to 12 hours. By conducting the carbonization under vacuum, the discharge capacity and the initial efficiency can be further improved.

(4) Thickness Of The Low-Crystalline Carbon

As the amount of the low-crystalline carbon particles or particle aggregates covering the surface of carbon particles in the low-crystallinity carbon-coated carbon material, namely the thickness of the low-crystalline carbon (hereinafter simply referred to as "thickness of low-crystalline carbon"), increases, the material becomes less reactive with the organic solvent in the electrolyte solution used in nonaqueous lithium secondary batteries.

Therefore, as the thickness of low-crystalline carbon in the carbon material used as the negative electrode material for lithium secondary batteries increases, damages connected with the decomposition of electrolyte solution or the destruction of negative electrode are abated. However, an excessive thickness of the low-crystalline carbon may adversely affect the charge/discharge characteristics of the carbon material as the negative electrode material.

According to the findings obtained by the present inventors, lithium secondary batteries with balanced safety and charge/discharge characteristics can be produced by using, as the negative electrode material, a carbon material having a thickness of low-crystalline carbon of not more than 0.1 μm, usually about 0.01 to 0.1 μm.

The thickness of low-crystalline carbon in the low-crystallinity carbon-coated carbon material can be controlled by adjusting the amount of the organic compound covering the graphite material after immersion in the organic compound and washing treatment prior to carbonization, namely the thickness of the organic compound layer (hereinafter referred to as "thickness of organic compound").

The thickness of the organic compound can be controlled by suitably selecting or adjusting the immersion temperature and immersion time on the occasion of immersion of the graphite material to serve as the core material in the organic compound or the kind of organic solvent for washing treatment, the washing time and the washing temperature. A low-crystallinity carbon-coated carbon material having a decreased thickness of the low-crystalline carbon can be prepared at the higher immersion temperatures and, conversely, a low-crystallinity carbon-coated carbon material having an increased thickness of the low-crystalline carbon can be prepared at lower immersion temperatures.

Further, a low-crystallinity carbon-coated carbon material with an increased thickness of the low-crystalline carbon can be prepared by prolonging the immersion time and, conversely, a low-crystallinity carbon-coated carbon material with a decreased thickness of the low-crystalline carbon can be prepared by reducing the immersion time.

Furthermore, a low-crystallinity carbon-coated carbon material having a decreased thickness of the low-crystalline carbon can be prepared by using an organic solvent having high detergency or by prolonging the washing time or raising the washing temperature and, conversely, a low-crystallinity carbon-coated carbon material having an increased thickness of the low-crystalline carbon can be prepared by using an organic solvent having low detergency or by reducing the washing time or lowering the washing temperature.

(5) Particle Size Adjustment

A carbon material suited for use as a negative electrode material for lithium secondary batteries can be produced by adjusting the particle size of the low-crystallinity carbon-coated carbon material. The particle size adjustment of the low-crystallinity carbon-coated carbon material can be effected by comminution and classification. The dispersion and classification of the low-crystallinity carbon-coated carbon material can be carried out using a feather mill and a pneumatic classifier.

By the dispersion and classification, those particles which are aggregates resulting from excessive mutual adhesion of carbon particles can be disintegrated or removed and the particle size and particle size distribution of the low-crystallinity carbon-coated carbon material can be adjusted within respective ranges suited for its use as a negative electrode material for lithium secondary batteries.

By adjusting the number-average particle size of the low-crystallinity carbon-coated carbon material to 5 to 40 μm, preferably 5 to 20 μm, the maximum particle size to 50 μm or below, preferably 30 μm or below, and the minimum particle size to 3 μm or above, preferably 5 μm or above, through the dispersion and classification processes, it is possible to obtain a material suitable as the negative electrode material which is easy in handling in the steps of negative electrode production and which efficiently expresses its improved characteristics in the form of negative electrodes.

By subjecting the low-crystallinity carbon-coated carbon material again to a series of processes comprising immersion in an organic compound, washing, carbonization and particle size adjustment, a low-crystallinity carbon-coated carbon material with the surface of the carbon particles or particle aggregates fully covered with a double-layer structure of low-crystallinity carbon can be obtained.

(6) Lithium Secondary Battery

A negative electrode of a lithium secondary battery, which may have any desired shape or form, can be prepared by molding, under conventional techniques, the low-crystallinity carbon-coated carbon material, if necessary after particle size adjustment, and if necessary in combination with a terminal. The low-crystallinity carbon-coated carbon material can also be used in the form of a paste in admixture with a dispersion of a resin such as polytetrafluoroethylene (PTFE). By using such negative electrode for lithium secondary battery as a constituent, a lithium secondary battery with high discharge capacity and initial efficiency can be produced.

In more detail, a lithium secondary battery can be produced according to conventional techniques, using the negative electrode obtained in the above manner as a component in combination with other battery components such as positive electrode, electrolyte (electrolyte solution), etc. A nonaqueous lithium secondary battery can be produced by using, as the electrolyte, an electrolyte solution prepared by dissolving the electrolyte in an organic solvent, and a solid electrolyte-based lithium secondary battery can be produced by using a solid electrolyte.

FUNCTIONS

A graphite material with cavities formed in the carbon crystal structure thereof shows a discharge capacity exceeding 372 Ah/kg, hence has an advantage in that it can store a large amount of lithium. Further, a carbon material prepared by coating the graphite material with a low-crystalline carbon is low in reactivity with the organic solvent in electrolyte solution used in nonaqueous lithium secondary batteries and, therefore, the decomposition of the electrolyte solution, or the destruction of the negative electrode (carbon material) will not occur in those lithium secondary batteries in which the low-crystallinity carbon-coated carbon material is used as the negative electrode material. As a result, the lithium secondary battery of the present invention has the advantage that it shows a high value of charge/discharge efficiency and is excellent in battery safety.

The advantage of the invention may be attributable to the following; the edge planes of active crystallites in a conventional graphite material are oriented outwardly and render the material highly reactive with the organic solvent in the electrolyte solution. In contrast, the edge planes of active crystallites in the graphite material of the invention are covered by the low-crystalline carbon in which the basal-planes (polycyclic condensed carbon network) are oriented outwardly, so that the reaction thereof with the organic solvent in the electrolyte solution is inhibited.

Further, when the low-crystallinity carbon-coated carbon material prepared by using, as the core material, a graphite with cavities formed intentionally therein is compared with the untreated graphite, an effect can be achieved in that when said coated carbon material is used as a negative material of a lithium secondary battery, the discharge capacity is about 1.3 times higher and the initial efficiency is as high as 90% and, therefore, the volume and weight of the negative electrode as compared with other lithium secondary batteries are markedly reduced on the same performance characteristics basis.

EXAMPLES

The following examples and comparative examples are further illustrative of the present invention. The results obtained in the examples and comparative examples are collectively shown in Table 1.

Example 1

[Modification Of Graphite—(1)]

Natural graphite (100 g) of the Madagascar origin was comminuted in a Nippon Pneumatic Industry's supersonic jet grinder (LABO JET MILL) at an outlet pressure of 6 kgf/cm². The structural parameters D, $c_0$, $a_0$, Lc and La of the modified graphite were 2.24 g/cc, 0.67125 nm, 0.24626 nm, 92.7 nm and 139.0 nm, respectively.

[Modification Of Graphite—(2)]

The graphite modified as described above was immersed in a tar at 150° C. for 2 hours. This mixture was placed in a stainless steel tank and filtered under an inside pressure of 3 kg/cm² while the temperature was maintained at 200° C., whereby a solid mass was obtained. One part by weight of tar middle oil (boiling range: 230–330° C.) was added to one part of said solid mass and the mixture was subjected to primary washing at 80° C. for 1 hour with stirring and then filtered off to give a tar-coated graphite.

One part by weight of toluene was added to 1 part by weight of the tar-coated graphite, and secondary washing treatment was conducted with stirring at 20° C. for 1 hour, followed by filtration to give a purified tar-coated graphite. The purified tar-coated graphite was carbonized by firing at 1,000° C. for 1 hour. The low-crystallinity carbon-coated carbon material thus obtained was comminuted and classified for particle size adjustment to give a carbon material with a number average particle size of about 10 µm.

[Carbon Electrode (Working Electrode) Preparation]

Four parts by weight of dispersion-type PTFE (D-1, product of Daikin Industries, Ltd.) was admixed with 96 parts by weight of the modified carbon material and, after uniformly stirring in a liquid phase, the mixture was dried to give a paste-like material. A carbon electrode was produced by applying 30 mg of the paste-like mixture obtained to a nickel mesh under pressure, followed by 6 hours of drying under vacuum at 200° C.

[Nonaqueous Battery Construction And Electrode Characteristics Measurement]

A lithium secondary battery was constructed using the carbon electrode obtained as described above as the negative electrode, a sufficient amount of lithium metal as the counter electrode, a mixed solvent composed of ethylene carbonate and diethyl carbonate (1:1 by volume) with $LiClO_4$ dissolved therein at a concentration of 1 mole/liter as the electrolyte solution, and a nonwoven polypropylene fabric as the separator. The charge/discharge characteristics of the lithium secondary battery obtained were measured. The measurements were made under constant current charge/discharge conditions at 0.1 mA/cm². After charging to 0 V, the discharge was allowed to proceed until 2 V. The discharge capacity is the capacity at the cut voltage of 2.0 V.

Example 2

A lithium secondary battery was constructed and evaluated in the same manner as in Example 1 except that the step of graphite modification (2) was repeated twice.

Example 3

A lithium secondary battery was constructed and evaluated in the same manner as in Example 1 except that pitch was used in place of the tar and the immersion temperature was 300° C. in the step of graphite modification (2).

Example 4

A lithium secondary battery was constructed and evaluated in the same manner as in Example 1 except that pitch was used in place of the tar and the immersion temperature was 300° C. in the step of graphite modification (2) and that the step was repeated twice.

Examples 5 to 8

Lithium secondary batteries were constructed and evaluated in the same manner as in Examples 1 to 4 except that the carbonization was carried out at 1,150° C. in the step of graphite modification (2).

Examples 9 to 16

Lithium secondary batteries were constructed and evaluated in the same manner as in Examples 1 to 8 except that the carbonization was carried out in a vacuum atmosphere in the step of graphite modification (2).

Example 17

A lithium secondary battery was constructed and evaluated in the same manner as in Example 1 except that the step of graphite modification (2) was omitted.

Comparative Example 1

A lithium secondary battery was constructed and evaluated in the same manner as in Example 1 except that the step of graphite modification (1) was omitted.

Example 18

The procedures of graphite modification (1), graphite modification (2), and carbon electrode (working electrode) preparation of Example 1 were followed.

[Solid Electrolyte Battery Construction And Electrode Characteristics Measurement]

A solution prepared by dissolving polyethylene oxide (molecular weight: 600,000) and $LiClO_4$ in acetonitrile was cast onto a PTFE plate in a glove box in an argon atmosphere. The solvent was evaporated by allowing the composite to stand at 25° C. in the glove box. Further drying gave a solid electrolyte, namely $(PEO)_8LiClO_4$.

Using the carbon electrode prepared in Example 1, $LiCoO_2$ as the positive electrode, and the solid electrolyte $(PEO)_8LiClO_4$, a secondary battery was constructed and measured for charge/discharge characteristics. The measurements were conducted under constant current charge/discharge conditions at 0.1 mA/cm². After charging to 4.1 V in terms of battery voltage, the discharge was allowed to proceed until 1.2 V.

Example 19

A lithium secondary battery was constructed and evaluated in the same manner as in Example 18 except that the step of graphite modification (2) was omitted. The structure parameters, D, $c_0$, $a_0$, Lc and La, of the core material used were 2.24 g/cc, 0.67125 nm, 0.24626 nm, 272.4 nm and 121.6 nm, respectively.

Comparative Example 2

A lithium secondary battery was constructed and evaluated in the same manner as in Example 18 except that the step of graphite modification (1) was omitted.

TABLE 1

| | Structure parameters of the core material | | Electrode characteristics of the carbon electrode | |
|---|---|---|---|---|
| | $d_{002}$ (nm) | CI (−) | Discharge capacity (Ah/kg) | Initial efficiency (%) |
| Example 1 | 0.3356 | 0.0197 | 450 | 88.0 |
| Example 2 | 0.3356 | 0.0197 | 445 | 89.6 |
| Example 3 | 0.3356 | 0.0197 | 430 | 90.1 |
| Example 4 | 0.3356 | 0.0197 | 415 | 90.8 |
| Example 5 | 0.3356 | 0.0197 | 410 | 90.0 |
| Example 6 | 0.3356 | 0.0197 | 396 | 90.5 |
| Example 7 | 0.3356 | 0.0197 | 392 | 89.7 |
| Example 8 | 0.3356 | 0.0197 | 381 | 89.4 |
| Example 9 | 0.3356 | 0.0197 | 454 | 88.5 |
| Example 10 | 0.3356 | 0.0197 | 448 | 90.1 |
| Example 11 | 0.3356 | 0.0197 | 436 | 90.5 |
| Example 12 | 0.3356 | 0.0197 | 419 | 91.1 |
| Example 13 | 0.3356 | 0.0197 | 415 | 90.4 |
| Example 14 | 0.3356 | 0.0197 | 402 | 90.8 |
| Example 15 | 0.3356 | 0.0197 | 399 | 90.0 |
| Example 16 | 0.3356 | 0.0197 | 390 | 89.9 |
| Example 17 | 0.3356 | 0.0197 | 430 | 69.8 |
| Compar. Ex. 1 | 0.3356 | 0.0178 | 360 | 90.5 |
| Example 18 | 0.3356 | 0.0197 | 452 | 90.1 |
| Example 19 | 0.3356 | 0.0197 | 431 | 78.3 |
| Compar. Ex. 2 | 0.3356 | 0.0178 | 363 | 90.8 |

What is claimed is:

1. A graphite material satisfying the following characteristics requirements:
  (A) The interplanar spacing ($d_{002}$) determined by wide-angle X ray diffractometry for the plane (002) is not more than 0.336 nm;
  (B) The cavity index (CI) defined by the following expression is not less than 0.019:

$$CI = 1 - \frac{D}{D^i} \times \frac{C_0}{C_0^i} \times \left(\frac{a_0}{a_0^i}\right)^2 \times \frac{Lc}{Lc + C_0/2} \times \left(\frac{La}{La + a_0}\right)^2$$

where D represents the density, $c_0$ and Lc represent the lattice constant and crystallite size, respectively, in the direction of c axis, $a_0$ and La represent the lattice constant and crystallite size, respectively, in the direction of a axis, and the superscript "i" represents the value for an ideal graphite; the density value is the value obtained by the method according to JIS R 7212 and the crystallite size value is the value obtained by the method established by the Japan Society for the Promotion of Science;
  (C) The discharge capacity exceeds 372 Ah/kg.

2. A carbon material coated with a low-crystalline carbon which is characterized in that the graphite material as defined in claim 1 is coated with a coat-forming carbon material.

3. A carbon material coated with a low-crystalline carbon which is characterized in that the graphite material as defined in claim 1 is coated with a double-layer structure formed from coat-forming carbon materials.

4. A process for preparing the low-crystallinity carbon-coated carbon material as defined in claim 2 which comprises immersing the graphite material, which serves as the core material, in an organic compound at 10–300° C., separating the graphite material from the organic compound, adding an organic solvent to the separated graphite material and effecting washing treatment at 10–300° C., and then carbonizing the washed graphite material.

5. A process for preparing the low-crystallinity carbon-coated carbon material as defined in claim 3 which comprises
  (a) immersing the graphite material which services as the core material, in an organic compound at 10–300° C. separating the graphite material from the organic compound, adding an organic solvent to the separated graphite material and effecting washing treatment at 10–300°, and then carbonizing the washed graphite material, and
  (b) immersing the carbon material obtained by step (a) in an organic compound, adding an organic solvent to the separated carbon material and effecting washing treatment at 10–300° C., and then conducting carbonizing the washed graphite material.

6. A process as defined in claim 4 wherein the carbonization is carried out under vacuum.

7. A process as defined in claim 4 wherein the organic compound is a carbonizable pitch or tar.

8. A negative electrode material for a lithium secondary battery which comprises the graphite material as defined in claim 1.

9. A negative electrode for a lithium secondary battery comprising the negative electrode material as defined in claim 8.

10. A nonaqueous lithium secondary battery comprising the negative electrode as defined in claim 9.

11. A solid electrolyte lithium secondary battery comprising the negative electrode as defined in claim 10.

12. A process as defined in claim 5 wherein the carbonization is carried out under vacuum.

13. A process as defined in claim 5 wherein the organic compound is carbonizable pitch or tar.

14. A negative electrode material for a lithium secondary battery which comprises the carbon material as defined in claim 2.

15. A negative electrode material for a lithium secondary battery which comprises the carbon material as defined in claim 3.

* * * * *